(12) United States Patent
Emejulu et al.

(10) Patent No.: US 8,910,146 B2
(45) Date of Patent: Dec. 9, 2014

(54) AUTOMATED TIME-TO-VALUE MEASUREMENT

(75) Inventors: Nnaemeka I. Emejulu, Austin, TX (US); Andrew J. Lavery, Austin, TX (US); Ye Liu, Belmont, MA (US); Mario A. Maldari, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 13/492,829

(22) Filed: Jun. 9, 2012

(65) Prior Publication Data

US 2013/0332919 A1   Dec. 12, 2013

(51) Int. Cl.
*G06F 9/445*   (2006.01)

(52) U.S. Cl.
USPC ........... 717/174; 717/133; 717/173; 717/175; 717/176; 717/177; 717/178

(58) Field of Classification Search
None
See application file for complete search history.

(56) References Cited

U.S. PATENT DOCUMENTS

| | | | | |
|---|---|---|---|---|
| 6,539,539 | B1 | 3/2003 | Larsen et al. | |
| 6,598,012 | B1 | 7/2003 | Berry et al. | |
| 6,928,639 | B2* | 8/2005 | Juan et al. | 717/127 |
| 7,111,282 | B2 | 9/2006 | Stephenson | |
| 8,302,079 | B2* | 10/2012 | Bansal | 717/127 |
| 2005/0160405 | A1 | 7/2005 | Lunia et al. | |
| 2007/0233782 | A1* | 10/2007 | Tali | 709/203 |
| 2008/0034082 | A1 | 2/2008 | McKinney | |
| 2008/0126791 | A1* | 5/2008 | Weiner et al. | 713/100 |
| 2008/0215358 | A1* | 9/2008 | Goldszmidt et al. | 705/1 |
| 2009/0094584 | A1 | 4/2009 | Dheap et al. | |
| 2010/0333072 | A1* | 12/2010 | Dulip et al. | 717/128 |
| 2012/0089966 | A1* | 4/2012 | Martin et al. | 717/133 |
| 2012/0159454 | A1* | 6/2012 | Barham et al. | 717/128 |

FOREIGN PATENT DOCUMENTS

EP   1428125   6/2004

OTHER PUBLICATIONS

David Greenwood, "Understanding & Defining Time to Value—A powerful metric for Enterprise IT Success", May 12, 2009, (Whole Document) see web-page: "http://thinkinformatics.blogspot.com/2009/05/understanding-defining-time-to-value.html".*
Precise; The Case for Adaptive Instrumentation in J2EE Environments; White Paper—Application Performance Management; 2009; pp. 1-10.
CSC; Continuous Delivery; White Paper; 2009; pp. 1-21.
Scacchi, Walt; Understanding Software Productivity; Appears in "Advances in Software Engineering and Knowledge Engineering"; D. Hurley (ed.), vol. 4, pp. 37-70 (1995); Dec. 1994.
Ishigaki, Doug; Effective Management though Measurement; Internet library (www.ibm.com/developerworks/rational/library/4786.html); May 14, 2004.
Sommerville, Ian; Fitting Software to the Organization: Reducing Time to Value for New Software Systems; 19th Australian Conference on Software Engineering; Abstract; 2008.

* cited by examiner

*Primary Examiner* — Don Wong
*Assistant Examiner* — Roberto E Luna
(74) *Attorney, Agent, or Firm* — James L. Baudino

(57) ABSTRACT

According to one aspect of the present disclosure, a method and technique for automated time-to-value (TTV) measurement is disclosed. The method includes: initiating an installation module of an application to install the application on a data processing system; responsive to initiating installation of the application via the installation module, monitoring, via a TTV module of the application, a time period associated with the installation of the application; and recording, by the TTV module, the time period corresponding to the installation of the application.

10 Claims, 5 Drawing Sheets

AUTOMATED TIME-TO-VALUE MEASUREMENT

BACKGROUND

Time-to-value (TTV) is a measurement indicating the time it takes to receive a return on an investment. In the context of a software product or application, the TTV measurement may reflect the time it takes to obtain some benefit or value based on the operation of the software product. Ideally, a consumer or user of the software product desires very little time before the software product is delivering high value.

BRIEF SUMMARY

According to one aspect of the present disclosure a method and technique for automated time-to-value (TTV) measurement is disclosed. The method includes: initiating an installation module of an application to install the application on a data processing system; responsive to initiating installation of the application via the installation module, monitoring, via a TTV module of the application, a time period associated with the installation of the application; and recording, by the TTV module, the time period corresponding to the installation of the application.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
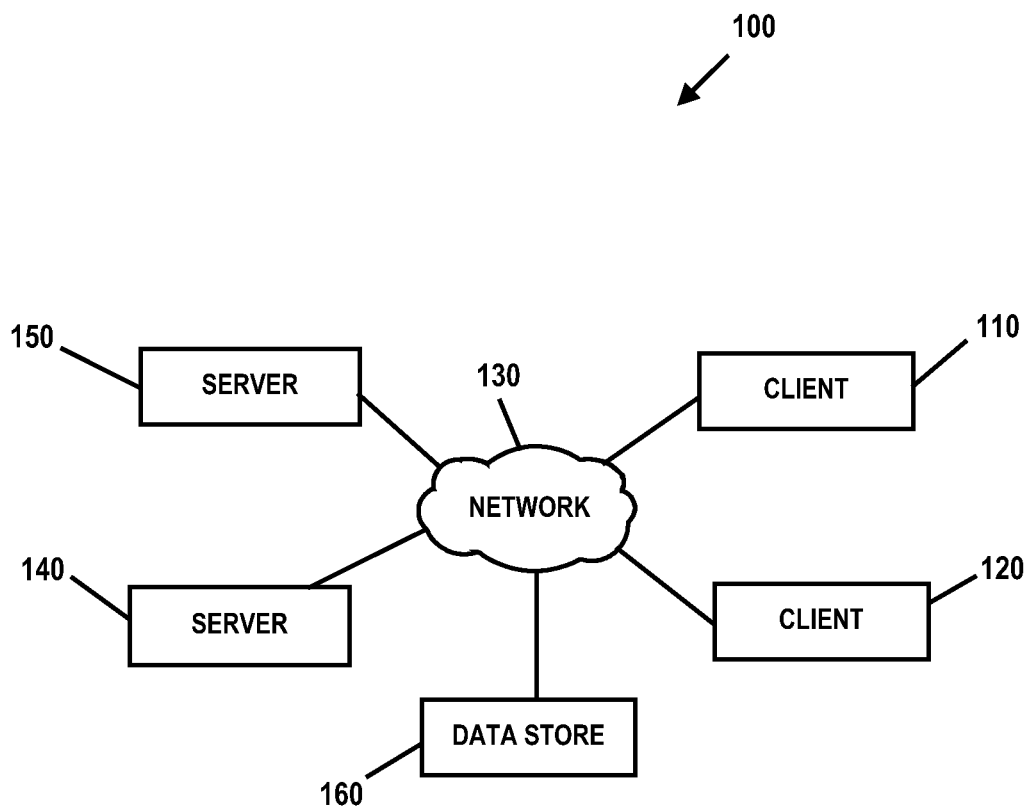
FIG. 1 is an embodiment of a network of data processing systems in which the illustrative embodiments of the present disclosure may be implemented.

Embodiments of the present disclosure provide a method, system and computer program product for automated time-to-value (TTV) measurement. For example, in some embodiments, the method and technique includes: initiating an installation module of an application to install the application on a data processing system; responsive to initiating installation of the application via the installation module, monitoring, via a TTV module of the application, a time period associated with the installation of the application; and recording, by the TTV module, the time period corresponding to the installation of the application. Thus, in some embodiments of the present disclosure, feedback regarding TTV information related to a particular product is collected automatically while the product is running/operating. Further, embodiments of the present disclosure enable TTV information collection over a lifecycle of a particular product. Additionally, embodiments of the present disclosure enable TTV information collection in a user/customer environment to efficiently determine TTV information from the user/customer perspective.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
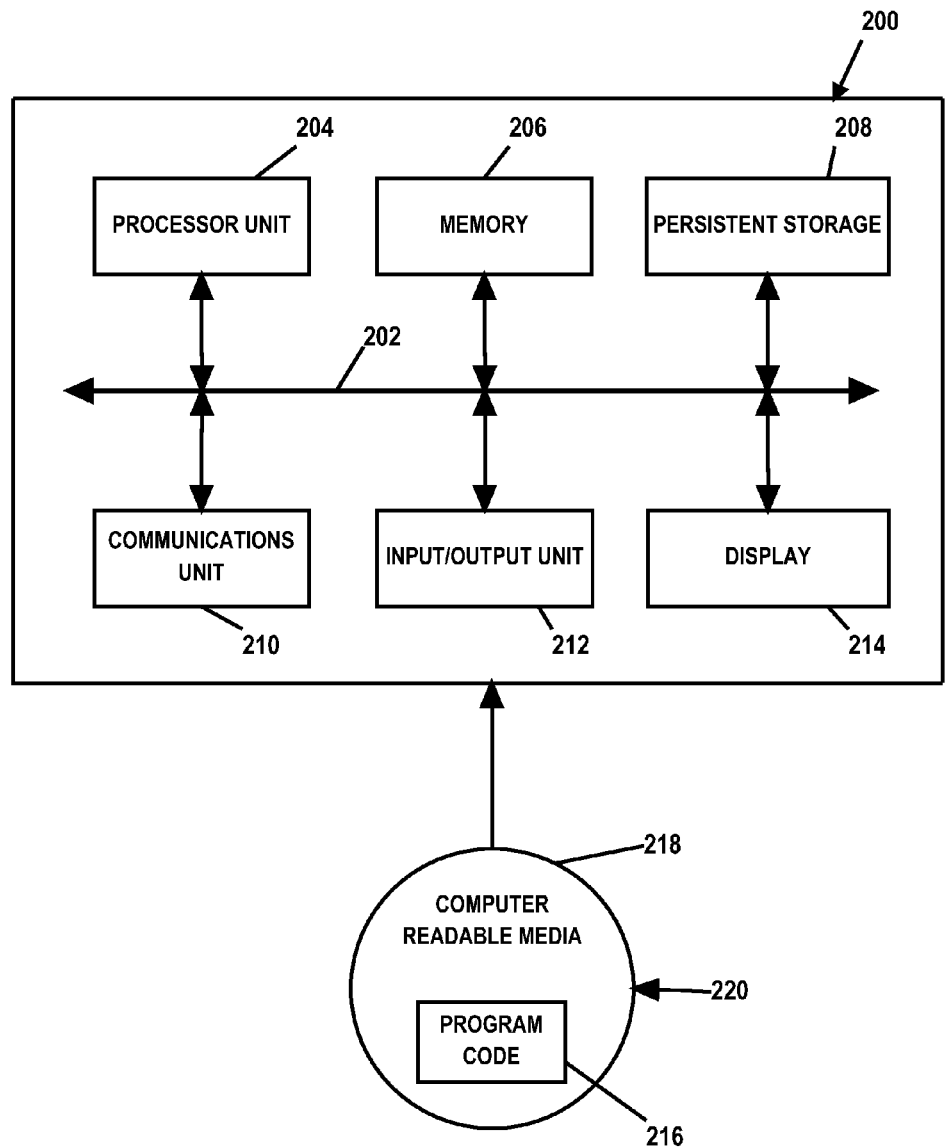
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of an automated time-to-value (TTV) measurement system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
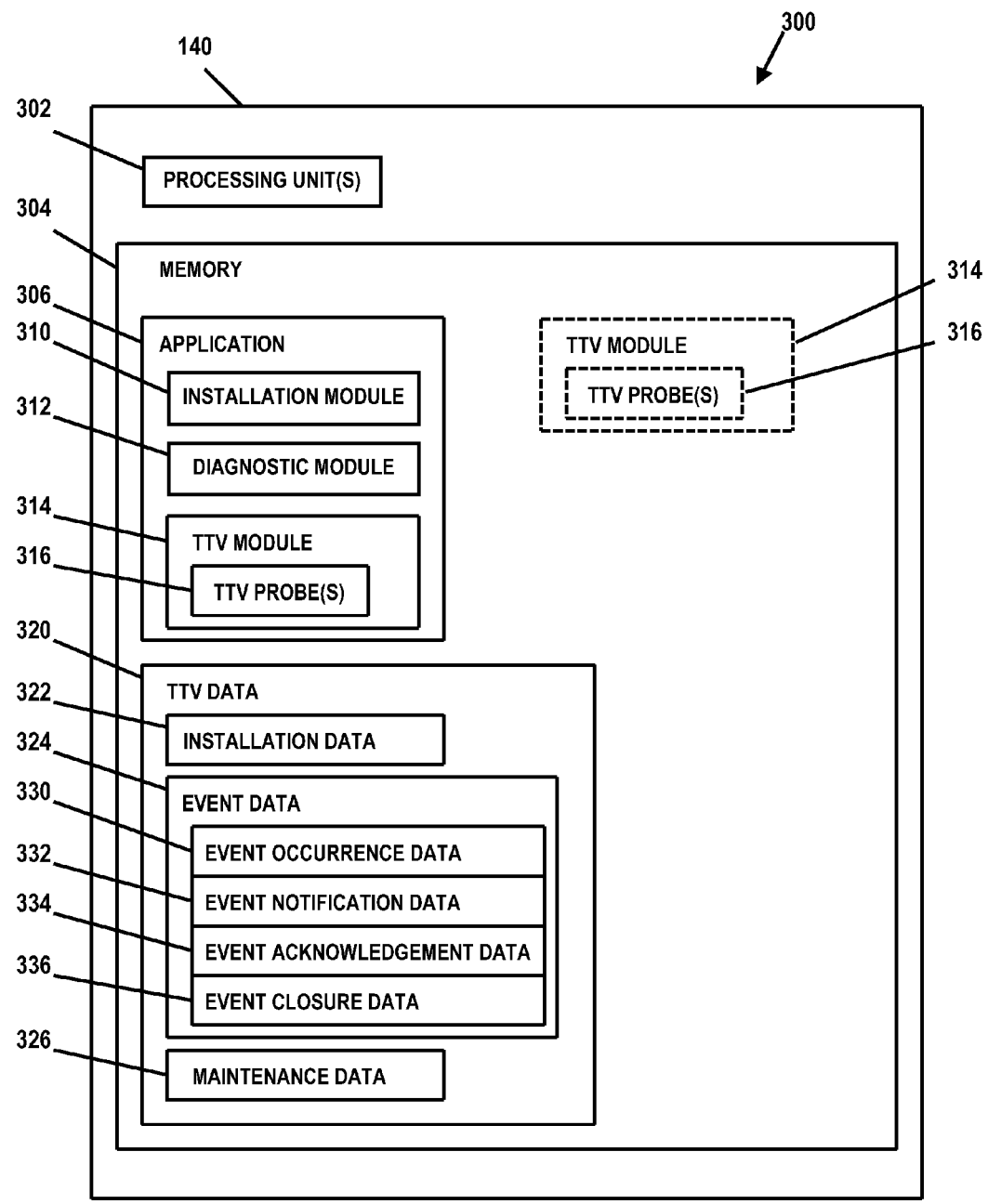
FIG. 3 is a diagram illustrating an embodiment of a data processing system for automated TTV measurement in which illustrative embodiments of the present disclosure may be implemented.

FIG. 3 is an illustrative embodiment of a system 300 for automated TTV measurement. System 300 may be implemented on data processing systems or platforms such as, but not limited to, servers 140 and/or 150, clients 110 and/or 120, or at other data processing system locations. For example, in the embodiment illustrated in FIG. 3, an embodiment of system 300 is implemented on a data processing system such as server 140. It should be understood that embodiments of the present disclosure may be implemented elsewhere such as, but not limited to, client 110 and/or server 150.

In FIG. 3, system 300 includes one or more processor units 302 and a memory 304. In the embodiment illustrated in FIG. 3, memory 304 includes an application 306. Application 306 may comprise any type of application, software program or executable routine or instruction set for performing a corresponding function. In the embodiment illustrated in FIG. 3, application 306 includes an installation module 310, a diagnostic module 312 and a TTV module 314. Application 306, installation module 310, diagnostic module 312 and/or TTV module 314 may be implemented in any suitable manner using known techniques that may be hardware-based, software-based, or some combination of both. For example, application 306, installation module 310, diagnostic module 312 and/or TTV module 314 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Installation module 310 comprises a set of instructions or routines for loading or installing application 306 onto a data processing system such as server 140. In the embodiment illustrated in FIG. 3, application 306 is illustrated as being stored in memory 304 so as to be accessible and executable by processing unit 302; however, it should be understood that application 306 may be stored and/or otherwise loaded onto server 140 from another location, even remote from server 140. Installation module 310 may comprise a series of instructions that automatically load and/or store application 306 on server 140 to enable execution thereof by processing unit 302. The series of installation instructions may include one or more phases of installation routines or sub-routines such as, but not limited to, display and/or acknowledgement of acceptance of licensing provisions, display and/or receiving input/confirmation of various configuration settings, display and/or acknowledgement of the installation of various components or modules of application 306, extracting various files and/or code, loading/storing code onto server 140 for various components of application 306, configuring various components of application 306, etc.

Diagnostic module 312 may comprise a set of instructions and/or routines associated with monitoring of the operation of application 306 (e.g., during execution and/or running thereof) and/or the notification/resolution of an event or problem associated with the operation or performance of application 306. For example, in some embodiments, diagnostic module 312 may comprise a monitoring and/or diagnostic tool that may monitor the operation or performance of application 306 (e.g., monitoring response times of a web application), generate an alert or other type of notice of an event or irregularity corresponding to the operation or performance of application 306 (e.g., response times exceeding a predetermined threshold) and/or provide an interface enabling a user to acknowledge the event and investigate/resolve the event. Diagnostic module 312 may enable the user/administrator to investigate the problem and determine a root cause of the problem. Diagnostic module 312 may present and/or otherwise display a series of different screens or interface pages and launching in context to various portions of application 306. Once the problem has been resolved, the user/administrator may mark or indicate the problem as resolved or closed within diagnostic module 312.

TTV module 314 may comprise a set of instructions and/or routines for determining a time-to-value measurement associated with various aspect of application 306. For example, in some embodiments, TTV module 314 is configured to monitor, measure, collect and/or otherwise determine time periods or TTV values associated with various aspects of application 306 (e.g., collecting statistics, information and/or measurement data to determine how long it takes a customer/user to achieve value from the software product or application 306). In some embodiments, TTV module 314 may include one or more TTV probes 316 that execute concurrently with application 306 that track, collect and/or log information about time periods that transpire corresponding to different functions and/or operations associated with application 306. For example, in some embodiments, one or more of TTV probes 316 may monitor and/or track time periods associated with an installation of application 306 onto server 140 via installation module 310 (e.g., monitoring and recording a time period associated with each phase of installation of application 306). One or more of TTV probes 316 may also be used while application 306 is running/operating (e.g., to monitor and/or track time periods associated with the occurrence, notification, investigation and resolution of an event associated with the operation or performance of application 306 using diagnostic module 312 (e.g., monitoring and recording a time periods associated with each phase of event processing from the time an event occurs to the time when the user finishes investigating the event and the event or ticket is closed) or other type of operating parameter or function)). In the embodiment illustrated in FIG. 3, TTV module is illustrated as being part of and/or a component of application 306 such that the various operations and/or functions associated with TTV module 314 are instrumented as part of application 306 (e.g., instrumented code for tracking, collecting and/or logging values/data associated with application 306). However, it should also be understood that TTV module 314 may be configured as a separate and/or stand-alone executable that may be used to collect TTV information associated with one or more applications that may be operating and/or being installed on server 140 (e.g., TTV module 314 configured to run as a background process to monitor the installation and/or operation of the various programs or applications running on server 140).

In the embodiment illustrated in FIG. 3, memory 304 also includes TTV data 320 comprising information collected and/or otherwise acquired by TTV module 314. For example, in FIG. 3, TTV data 320 includes installation data 322, event data 324 and maintenance data 326. TTV data 320 may comprise log files and/or other types of data storage mechanisms containing time-related information acquired by TTV module 314. Installation data 322 comprises information associated with time periods tracked, monitored and/or recorded/stored in connection with the installation of application 306 using installation module 310. Event data 324 comprises information associated with time periods tracked and/or monitored in connection with the operation and/or performance of application 306 based on activities associated with diagnostic module 312. For example, in the illustrated embodiment, event data 324 comprises event occurrence data 330, event notification data 332, event acknowledgment data 334, and event closure data 336. Event occurrence data 330 comprises time-related information associated with the occurrence of an event corresponding to the operation and/or performance of application 306. Event notification data 332 comprises time-related information corresponding to a notification or indication of the occurrence of the event (e.g., the display of a notification alert, transmittal of an event email communication etc.). Event acknowledgment data 334 comprises time-related information associated with a user/administrator acknowledgment of the notification event (e.g., providing an acknowledgement input via a display screen or input device to diagnostic module 312 corresponding to the event). Event closure data 336 comprises time related information associated with the closing or resolution of the event (e.g., investigation finished and/or resolution/closure of the event/ticket). The time related information of installation data 322 and event data 324 may comprise timestamps and/or timer information corresponding to different phases and/or process portions related to the installation of application 306 or the processing of an event associated with application 306 using diagnostic module 312, respectively. Maintenance data 326 comprises information associated with maintenance levels or versions (e.g., versions, installed patches, etc.) in place for application 306 at the time TTV measurements were taken and/or recorded by TTV module 314.

In operation, in response to the initiation and/or launch of installation module 310 of application 306, TTV module 314 launches and/or is otherwise initiated and interfaces with installation module 310 (or invokes various actions at various execution process points during execution of installation module 310) to begin tracking and/or monitoring a time period associated with the installation of application 306 on server 140. TTV module 314 may collect and/or record a timestamp as installation data 322 and/or otherwise initiate a timer to record a time duration associated with one or more phases of the installation process. At the end of the installation process, TTV module 314 may collect and/or record a timestamp as installation data 322 and/or otherwise terminate a timer recording the duration of the installation process. In some embodiments, TTV module 314 may suspend time period tracking in response to periods of installation inactivity. For example, installation module 310 may install application 306 in one or more phases such that a user/administrator may need to acknowledge the completion and/or initiation of a respective installation phase. As an example, installation module 310 may display a window containing license terms that a user/administrator must accept prior to continuing the installation process (e.g., by inputting an acceptance). TTV module 314 may record a timestamp at a beginning of the installation process. If the user/administrator does not respond with the acknowledgment and/or acceptance input within a predetermined time frame, TTV module 314 may record another timestamp and suspend and/or discontinue tracking the installation time period until the installation process is continued. Upon receipt of the acknowledgment/acceptance input from the user/administrator, TTV module 314 may record another timestamp associated with the continued installation process. If a timer or other mechanism is used to track and/or record the time period associated with a particular phase of the installation process, TTV module 314 may suspend the timer and re-initiate the timer upon the continuation of the installation process. Thus, TTV module 314 is configured to collect information associated with how long it takes the user/administrator to install application 306 to a position where application 306 is considered deployed and/or ready for use.

TTV module 314 may also be configured to compute a total TTV value associated with the installation process (e.g., evaluating timer data and/or timestamp data) and/or output the TTV information, in raw or tallied form (e.g., installation data 322) to the user/administrator or other entity. For example, TTV module 314 may calculate the time or TTV value associated with deployment of application 306 by comparing the "Start Time" of application 306 deployment to the "End Time" of application 306 deployment and removing an "Idle Time" durations (e.g., TTV="End Time of Deployment"–"Start Time of Deployment"–"Idle Time"). It should be understood that other methods may also be used to compute or derive the TTV value associated with the installation or deployment process of application 306.

As indicated above, TTV module 314 interfaces with and/or is otherwise instrumented as part of diagnostic module 312 to monitor, collect and/or log information associated with how long it takes a user/administrator to evaluate and/or resolve an event associated with the operation and/or performance of application 306. For example, diagnostic module 312 may be configured to monitor and/or report various operating and/or performance parameters associated with application 306. In response to detecting an irregularity and/or problem associated with the operation or performance of application 306, diagnostic module 312 may initiate a performance or event alert to notify a user/administrator of a performance issue. In response to the detection of the performance event by diagnostic module 312, TTV module 314 begins tracking and/or collecting information associated with the event (e.g., invoking various actions at various execution process points during execution of diagnostic module 312). For example, in response to the detection of the performance event by diagnostic module 312, TTV module 314 records a timestamp as event occurrence data 330. Diagnostic module 312 may display and/or otherwise notify the user/administrator of the performance event (e.g., a display on a console or display device, etc.). In response to the notification of the performance event by diagnostic module 312, TTV module 314 records a timestamp as event notification data 332. The display and/or notification of the performance event to the user/administrator by diagnostic module 312 may request an acknowledgment input by the user/administrator indicating an acknowledgment of the performance event and the initiation of an investigation of the performance event. In response to receiving such acknowledgment input, TTV module 314 records a timestamp as event acknowledgment data 334. Additionally, at the completion of the investigation and/or closing of the investigative process associated with the performance event by the user/administrator using diagnostic module 312, TTV module 314 records a timestamp as event closure data 336. It should also be understood that instead of timestamps, TTV module 314 may initiate a timer corresponding to each phase of the event investigation/resolution process performed in connection with diagnostic module 312.

TTV module 314 may also suspend time tracking and/or monitoring of the diagnostic process using diagnostic module 312 in response to durations or periods of inactivity. For example, in some embodiments, if an acknowledgment input is not received in response to notification of the performance event by diagnostic module 312 within a predetermined threshold or timeframe (e.g., as a result the user/administrator being away from the system, a delay in processing receipt of the acknowledgement input due to system load, etc.), TTV module 314 may collect another timestamp and/or suspend a timer recording the duration of the diagnostic phase and suspend further time tracking until the diagnostic activity with diagnostic module 312 resumes. Thus, for example, if there is a time period of inactivity associated with the investigation of the problem with diagnostic module 312, TTV module 314 suspends collecting information associated with the event until such time that the investigative process resumes. Accordingly, for example, if the performance alert is generated by diagnostic module 312 during a time when the user/administrator is absent, unavailable and/or otherwise unable to acknowledge or begin the investigative process of the event, TTV module 314 suspends tracking of the time period corresponding to the event until the process resumes (e.g., in response to receipt of performance alert acknowledgement and/or other activities associated with the process provided by diagnostic module 312). It should be understood that the investigative and/or diagnostic process provided by diagnostic module 312 may also include a number of phases such that TTV module 314 collects time-related information corresponding to each phase of the diagnostic process.

TTV module 314 may be configured to compute a total TTV value associated with the investigative process associated with diagnostic module 312 (e.g., evaluating timer data and/or timestamp data) and/or output the TTV information, in raw or tallied form (e.g., event data 324) to the user/administrator or other entity (e.g., a support group associated with the product/application, third party host/service, etc.). For example, TTV module 314 may calculate the time or TTV value associated with operational issues relating to application 306 by comparing the "Start Time" of a diagnostic process associated with application 306 to the "End Time" of the diagnostic process associated with application 306 and removing any "Idle Time" durations during the diagnostic process (e.g., TTV="End Time of Diagnostic Process"–"Start Time of Diagnostic Process"–"Idle Time"). It should be understood that other methods may also be used to compute or derive the TTV value associated with the operational or diagnostic process of application 306.

TTV module 314 may also collect maintenance information associated with application 306 (e.g., version or maintenance level, patch or fixpacks installed, etc.) and correlate such information (e.g., stored as maintenance data 326) to the TTV information collected at the time of such collection. For example, maintenance data 326 may include information correlating various event data 324 to a particular version of application 306. In response to the installation of a patch, upgrade to a newer version, etc., of application 306, TTV module 314 stores and/or otherwise records such maintenance information as maintenance data 326 and correlates further TTV installation and/or TTV event information to the particular maintenance level of application 306. For example, product/application maintenance (e.g., fixpacks, upgrades, etc.) may have a significant impact on TTV of a product/application. If a user/customer is using a version N of a product/application and is considering an upgrade to version N+1, TTV information associated with version N+1 may be an important consideration as to the impact of the upgrade to existing or anticipated services resulting from the use of the product/application. As an example, a customer/user may have certain scenarios where version N is used. TTV information associated with version N+1 in those scenarios may be needed to examine the potential impact to those scenarios. For instance, the user/customer may use the product/application to resolve network issues. In version N of the product/application, the average time to resolution of network issues may be four minutes. Embodiments of the present disclosure enable a user/customer to define their TTV scenarios, obtain TTV values associated with version N of the product/application, and utilize TTV values for version N+1 under the same or similar scenarios to obtain information as to the advantage/disadvantage of upgrading to version N+1. The TTV information may be correlated based on the user/customer scenarios (e.g., hardware and/or software implementations (e.g., the particular operating system in use), or other criteria applicable to the collected TTV information).

Additionally, by automatically tracking and/or monitoring TTV values corresponding to different maintenance levels in place at the time TTV information is collected, the effectiveness of support and/or development of the product/application can be readily evaluated/measured. For example, in one scenario, a time to resolve a network issue with version N of the product/application may be four minutes, but after applying a particular fixpack to the product/application, the time may have decreased to three minutes. Embodiments of the present disclosure enable the ready determination and/or evaluation of the effectiveness of product/application fixes, upgrades and/or patches.

Figure 4:
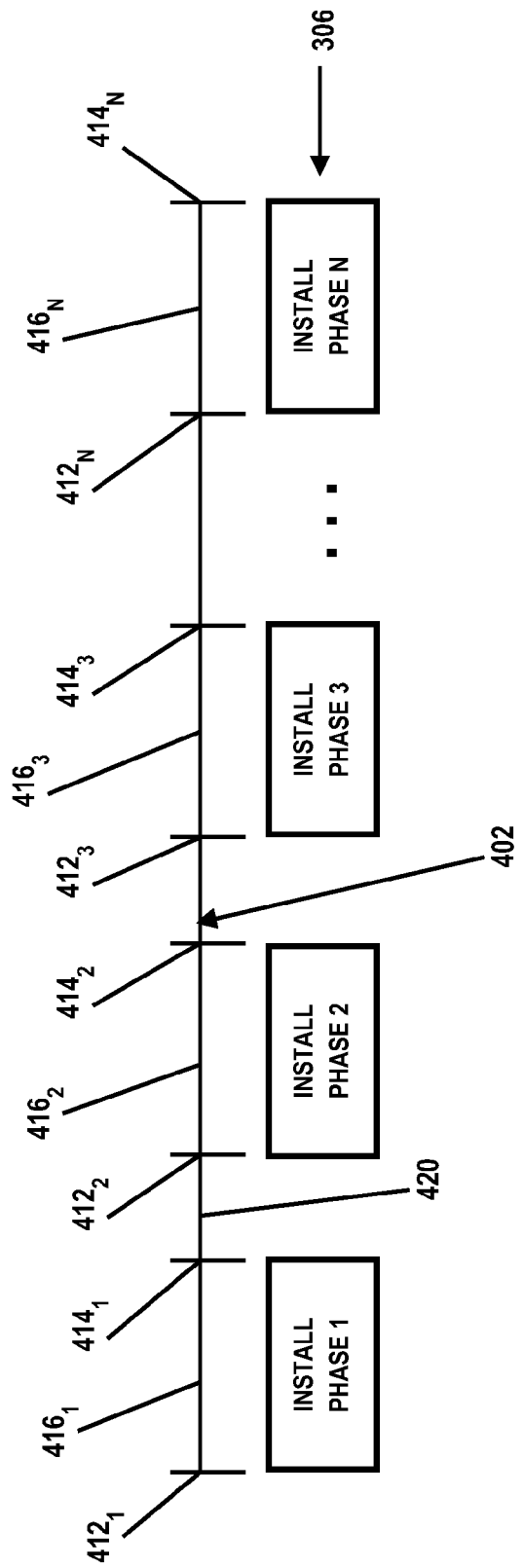
FIG. 4 is a diagram illustrating TTV information collection via a system for automated TTV measurement according to the present disclosure.

FIG. 4 is a diagram illustrating TTV information collection associated with an installation process for deploying application 306. In the embodiment illustrated in FIG. 4, reference number 402 represents a timeline extending from the beginning of the installation process to the end or completion of the installation process. The installation process performed by installation module 310 extends over a plurality of phases $410_1$-$410_n$. TTV probe 316 measures, records and/or otherwise collects the time associated with each phase of the $410_1$-$410_n$ of the installation process. For example, TTV probe 316 may measure, record and/or otherwise collect a timestamp $412_1$-$412_n$ at the beginning of each phase $410_1$-$410_n$ and measure, record and/or otherwise collect a timestamp $414_1$-$414_n$ at the end of each phase $410_1$-$410_n$. TTV probe 316 may also, or alternatively, initiate a timer or other time-recording mechanism to measure, record and/or otherwise collect a time period duration value $416_1$-$416_n$ corresponding to each phase of the $410_1$-$410_n$ of the installation process. As indicated above, if a delay or a period of inactivity exceeding some threshold is detected associated with the installation process (e.g., after the completion of a particular phase, before the beginning of a next phase, or even during a particular phase), TTV probe 316 may suspend time tracking and/or record another timestamp so that the time period corresponding to the delay and/or period of inactivity is not part of the TTV value for the installation process. For example, in FIG. 4, a period of delay or inactivity between phase $410_1$ and $410_2$, represented by reference number 420 in FIG. 4, may be determined and subtracted or omitted from the TTV value computation for the installation process (e.g., by suspending a timer during the time period 420 or determining a time corresponding to time period 420 using timestamps $414_1$ and $412_2$).

Figure 5:
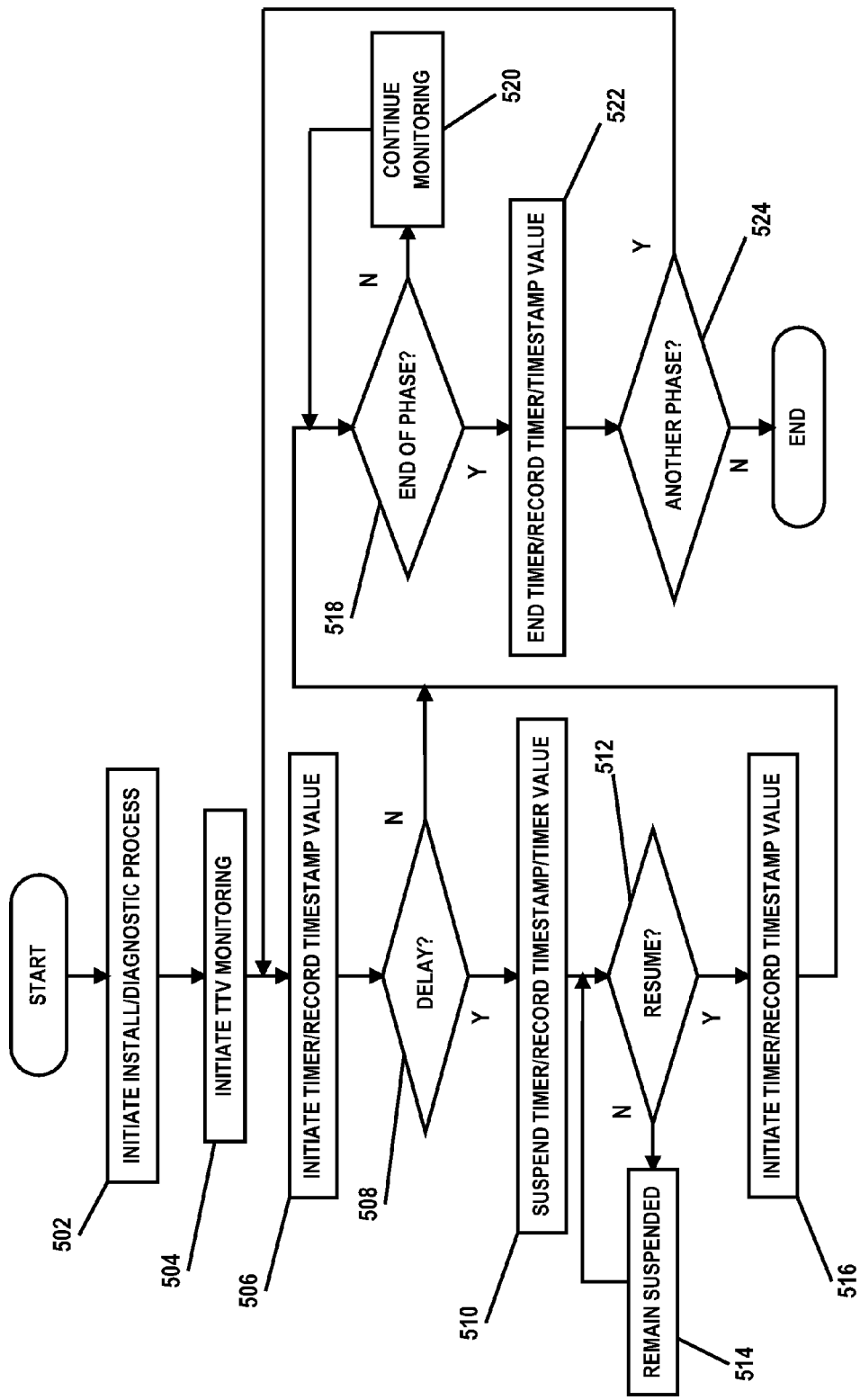
FIG. 5 is a flow diagram illustrating an embodiment of a method for automated TTV measurement according to the present disclosure.

FIG. 5 is a flow diagram illustrating an embodiment of a method for automatic TTV measurement associated with an application or software product according to the present disclosure. The method begins at block 502, where the installation and/or diagnostic process using the respective installation module 310 or diagnostic module 312 is initiated. At block 504, TTV module 314 initiates TTV collection of information corresponding to the installation and/or diagnostic process. At block 506, TTV module 314 initiates a timer and/or records a timestamp corresponding to a beginning of a particular phase of the installation/diagnostic process. At decisional block 508, a determination is made whether a delay or period of inactivity has been and countered associated with the installation/diagnostic process. If not, the method proceeds to decisional block 518. If a delay or period of inactivity is detected, the method proceeds from decisional block 508 to block 510, where TTV module 314 suspends the timer and/or records a timestamp or timer value. At decisional block 512, a determination is made whether the installation/diagnostic process has resumed. If not, the method proceeds to block 514, where the collection of TTV information remains suspended. If a determination has been made that the installation/diagnostic process has resumed, the method proceeds from decisional block 512 to block 516, where TTV module 314 initiates the timer and/or records a timestamp.

At decisional block 518, a determination is made whether the current phase of the installation/diagnostic process is completed. If not, the method proceeds to block 520, where TTV module 314 continues monitoring and collecting TTV information associated with the installation/diagnostic process. If a determination is made at block 518 that the current phase of installation/diagnostic process is completed, the method proceeds to block 522, where TTV module 314 suspends the timer and/or records a timestamp or timer value corresponding to the end of the installation/diagnostic phase. At decisional block 524, a determination is made whether there is another phase of the installation/diagnostic procedure. If so, the method proceeds to block 506.

Thus, embodiments of the present disclosure enable automatic and efficient (immediate and/or near immediate) feedback regarding TTV information related to a particular product. Further, embodiments of the present disclosure enable TTV information collection over a lifecycle of a particular product. Additionally, embodiments of the present disclosure enable TTV information collection in a user/customer environment to efficiently determine TTV information from the user/customer perspective.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method, comprising:
    initiating an installation module of an application to install the application on a data processing system;
    responsive to initiating installation of the application via the installation module, monitoring, via a time-to-value (TTV) module instrumented as part of the application, a time period associated with each phase of the installation of the application, wherein the TTV module is operable to identify a time period of inactivity associated with a respective phase of the installation of the application, and wherein the TTV module is operable to:
        responsive to a completion of a respective phase of the installation, determine whether a user input is received acknowledging initiation of a next phase of the installation; and responsive to a lack of the user input within a first predetermined timeframe, suspend a tracking of the time period of the installation; and computing and recording, by the TTV module, the time period corresponding to the installation of the application by deducting the time period of inactivity; and wherein the TTV module is further operable to:

responsive to an initiation of an alert associated with operation of the application, monitor a time period from the alert to a resolution of the alert;

responsive to a notification of the alert, determine whether a user input is received acknowledging receipt of the notification; and responsive to a lack of the user input within a second predetermined timeframe, suspend a tracking of the time period from the alert to the resolution of the alert.

2. The method of claim 1, wherein monitoring the time period comprises:

recording a timestamp at a beginning of a respective phase of the installation; and recording a timestamp at a conclusion of the respective phase of the installation.

3. The method of claim 1, wherein monitoring the time period from the alert to the resolution of the alert comprises tracking a time period corresponding to each phase of diagnostic activity associated with resolving the alert.

4. A system, comprising:

a processor unit;

an application executable by the processor unit, the application comprising an installation module instrumented as part of the application and configured to install the application on a data processing system, the application further comprising a time-to-value (TTV) module configured to:

responsive to initiation of the installation module to install the application, monitor a time period associated with each phase of the installation of the application, the TTV module operable to identify a time period of inactivity associated with a respective phase of the installation of the application;

responsive to a completion of a respective phase of the installation, determine whether a user input is received acknowledging initiation of a next phase of the installation;

responsive to a lack of the user input within a first predetermined timeframe, suspend a tracking of the time period of the installation;

compute and record the time period corresponding to the installation of the application by deducting the time period of inactivity;

responsive to an initiation of an alert associated with operation of the application, monitor a time period from the alert to a resolution of the alert;

responsive to a notification of the alert, determine whether a user input is received acknowledging receipt of the notification; and responsive to a lack of the user input within a second predetermined timeframe, suspend a tracking of the time period from the alert to the resolution of the alert.

5. The system of claim 4, wherein the TTV module is executable to:

record a timestamp at a beginning of a respective phase of the installation; and record a timestamp at a conclusion of the respective phase of the installation.

6. The system of claim 4, wherein the TTV module is executable to:

initiate a timer at a beginning of the installation; and suspend the timer in response to detecting a period of inactivity exceeding a predetermined threshold.

7. The system of claim 4, wherein the TTV module is executable to resume tracking of the time period of the installation in response to receiving the user input.

8. A computer program product for time-to-value (TTV) measurement, the computer program product comprising:

a non-transitory computer readable medium having computer readable program code embodied therewith, the computer readable program code comprising computer readable program code configured to:

initiate installation of an application to install the application on a data processing system;

responsive to initiating installation of the application, monitor a time period associated with each phase of the installation of the application;

identify a time period of inactivity associated with each phase of the installation of the application;

responsive to a completion of a respective phase of the installation, determine whether a user input is received acknowledging initiation of a next phase of the installation;

responsive to a lack of the user input within a first predetermined timeframe, suspend a tracking of the time period of the installation;

compute and record the time period corresponding to each phase of the installation of the application by deducting the time period of inactivity;

responsive to an initiation of an alert associated with operation of the application, monitor a time period from the alert to a resolution of the alert;

responsive to a notification of the alert, determine whether a user input is received acknowledging receipt of the notification; and responsive to a lack of the user input within a second predetermined timeframe, suspend a tracking of the time period from the alert to the resolution of the alert.

9. The computer program product of claim 8, wherein the computer readable program code is configured to:

record a timestamp at a beginning of a respective phase of the installation; and record a timestamp at a conclusion of the respective phase of the installation.

10. The computer program product of claim 8, wherein the computer readable program code is configured to:

initiate a timer at a beginning of the installation; and suspend the timer in response to detecting a period of inactivity exceeding a predetermined threshold.

* * * * *